June 9, 1936.  R. F. MALLINA  2,043,354
FILM FEEDING MECHANISM
Filed May 31, 1934
FIG. 1
FIG. 2
FIG. 3
FIG. 4
FIG. 5
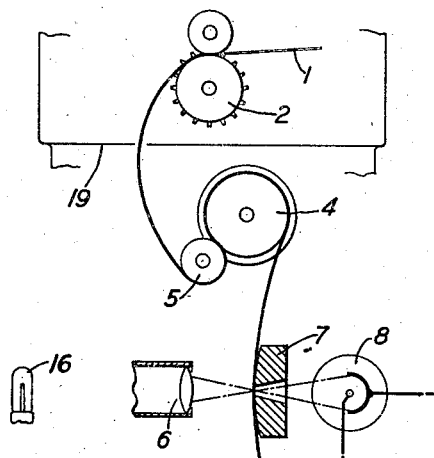
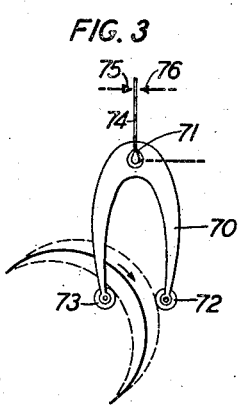
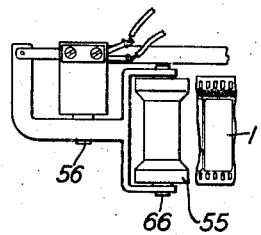
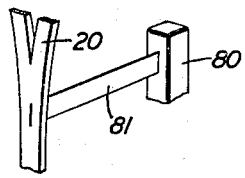
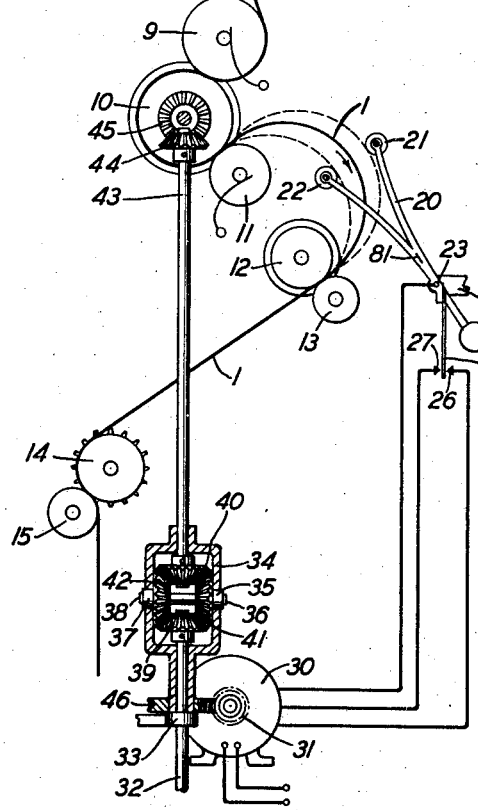
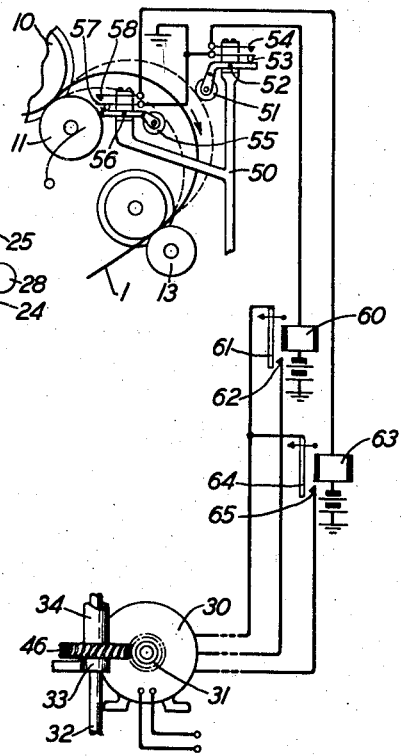
INVENTOR
R. F. MALLINA
BY
G. H. Heydt.
ATTORNEY Patented June 9, 1936

2,043,354

UNITED STATES PATENT OFFICE 2,043,354

FILM FEEDING MECHANISM

Rudolph F. Mallina, New York, N. Y., assignor to Bell Telephone Laboratories, Incorporated, New York, N. Y., a corporation of New York Application May 31, 1934, Serial No. 728,395

8 Claims. (Cl. 271—2.3)

This invention relates to sound picture recording and reproducing systems and more particularly to mechanism for driving a film in such systems at uniform velocity.

In recording and reproducing sound on film, difficulties arise from imperfect registration of film perforations with sprocket teeth and result in what is generally known as film flutter, the flutter from this imperfect registration having a detrimental effect upon the tone quality of the sounds translated. In order to avoid these difficulties it is desirable to employ a cylinder to which the film will adhere by friction for feeding the film past the point of sound translation. By this means the flutter caused by imperfect registration of the film with a sprocket may be eliminated from the sound translating area provided the film within this area is isolated by film loops from other sprockets used for feeding the film to other parts of the sound picture mechanism. In view of the inherent creeping tendency of a band of film as it passes over a cylindrical surface, a velocity regulator must be used in combination with the two types of film feeding devices to maintain synchronous relation between the pictures and accompanying sounds recorded or reproduced. The applicant is aware that arrangements have been devised for this purpose but insofar as he is aware the flutter resulting from imperfect registration of film perforations with sprocket teeth, is constantly present at the area of sound translation in these arrangements.

The object of this invention is therefore to provide a film velocity regulator associated with a loose loop of the film, formed between a film feeding friction roller and a film feeding sprocket which requires less film pressure for operation than would distort the film loop sufficiently to cause it to lose its flutter absorbing qualities.

One embodiment of the invention contemplates the use of a statically balanced film speed regulator having extensions with rollers thereon positioned a selected distance from each side of the film, which at this point is formed into an arcuate loop extending between the film feeding roller and a pair of guide rollers. The regulator or regulator extensions may be held in position by a light reed spring or any form of centering device which requires only a light pressure to overcome its resistance. The arc of the film in this loop may, as previously stated, become smaller or larger because of film imperfections or from the inherent creeping of the film as it passes over the film feeding roller. The film passing through this loop may thus be brought into contact with either one of the rollers of the speed regulator extensions. Electrical circuit contacts are associated with the speed regulator in such manner that a slight movement of the regulator extension by pressure from the film, establishes an electrical circuit for operating a motor for restoring the film loop to its normal path midway between the regulator rollers. The motor is operated in either direction depending upon the circuit established and thus a differential gear set under the control of the motor is operated in either direction for temporarily increasing or decreasing the speed of the film feeding roller. The speed of the motor and gearing associated therewith is such that the rate of change in the speed of the film feeding roller is slight in order that no perceptible change takes place in the translation of sound. The film loop is consequently very gradually returned to its normal path. In some instances, the use of slow relays or dash pot relays is required to sustain the motor circuit for a time period after the film has disengaged from the speed regulator rollers to allow sufficient time for restoring the film to its normal path.

In certain sound picture mechanisms a smooth film feeding roller has been used in combination with a speed regulator in which the film loop for operating the regulator is drawn tightly around a roller of the regulator. In this form of mechanism a loose loop is not maintained between the sprockets and the point of sound translation. It is found that in this type of film feeding arrangement where the film is held taut between the film feeding sprockets and the point of sound translation, a certain amount of flutter is transmitted to the point of sound translation regardless of intermediate film feeding or guide rollers. In the arrangement of the present invention in which the regulator may be operated by extremely light pressure from the film, the film loop is never pulled taut and thus is always in condition to absorb such flutter as may be transmitted from associated driving sprockets.

In the illustrated embodiment Fig. 1 shows the essential mechanism for guiding the film from a projector head through a sound translating unit and includes one form of the speed regulator;

Figs. 2 and 3 illustrate the modified forms of the speed regulator;

Fig. 4 is a form of roller which may be mounted upon a speed regulator arm preferably according to Fig. 2; and Fig. 5 is a perspective view of a centering device for the speed regulator arm of Fig. 1.

Referring to Fig. 1, the film 1 is of the usual type having both picture and sound records thereon. For the sake of simplicity, the picture head, reels and common driving motor with interconnecting gears have been omitted. It is contemplated that the common driving motor shall be connected through gears or belts to the apparatus of the picture head, sprocket 2, roller 10, sprocket 14, drive shaft 32 and reels for feeding the film 1 through the sound picture apparatus at constant speed. The film 1 is fed from the delivery reel (not shown) to the intermittent film feeding device of the picture head 19 from which it is withdrawn by sprocket 2. A loop is formed between sprocket 2 and guide rollers 4 and 5 to prevent the possible transmission of flutter from the sprocket 2 to the point of sound translation. The sound translating unit may be of the usual type which is herein shown as comprising lamp 16, optical unit 6, curved gate 7 and light sensitive cell 8 having conductors leading to an amplifying unit. The film feeding roller 10 withdraws the film from the sound translating unit. The guide rollers 9 and 11 are tensioned toward the film feeding roller 10 by springs to effect close adhesion between the film and the film feeding roller and to govern the circumferential dimension of the roller over which the film adheres. A loose loop of film is formed between the film feeding roller 10 and the guide rollers 12 and 13. The normal path of the film is shown midway between the regulator rollers 21 and 22. Dotted lines show the path of the film formed into arcuate loops, one smaller and one larger than the normal loop with the film in contact with the regulator rollers to indicate the tangential relation of the film and rollers when the film is pressed against the rollers for operating the regulator. The film is maintained taut between the guide rollers 12 and 13 and sprocket 14. The latter sprocket guides the film to the take-up reel (not shown).

The speed regulator 20, shown in Fig. 1, is pivoted on shaft 23 which is preferably journaled in anti-friction bearings mounted in frame members. The lower section of the regulator is formed into a counterweight 28 to produce a perfect balance between the upper and lower sections. It is, therefore, only necessary for the film to overcome the resistance of a centering device, such as shown in Fig. 5, to operate the regulator for closing contacts 24 and 26 or 24 and 27. The centering device of Fig. 5 comprises a thin and comparatively long reed spring 81 which is held rigid in frame member 80 and in the regulator 20. Various types of centering devices may however be used. The circuit established between the contacts 24 and 26 operates motor 13 to increase the speed of the roller 10 through the agency of the differential gears. The circuit established between contacts 24 and 27 operates motor 31 in the reverse direction to decrease the speed of the roller 10 through the agency of the differential gears. The differential gears 39, 40, 41 and 42 are enclosed in the housing 34 which is journaled on shaft 32 and shaft 43. The housing is fastened at its lower extremity to gear 46 which is operatively associated with gear 31 rigidly fastened to the motor shaft. The differential gears are of the usual type having gear 39 rigidly connected to shaft 32, gear 40 rigidly connected to shaft 43 and gears 41 and 42 mounted in bearings of the housing 34. Under normal driving conditions, the shaft 32, which is connected to the common driving motor through a set of gears, drives shaft 43, gears 44 and 45 and the film driving roller 10 at a given velocity. When the film loop, carried through the regulator arms, changes the position of the regulator and thus operates the motor, the housing 34 is rotated to increase or decrease the velocity of the film driving roller 10 through the agency of the differential gears. The film loop is thus returned to its normal position midway between the regulator rollers, the film regulator automatically returns to its normal position, and the operation of the motor 30 is arrested.

Fig. 2 illustrates a speed regulator 50 which is rigidly connected to the frame of the sound picture apparatus. In this embodiment, lever arms 52 and 56 are pivoted in the extension arms of the regulator. The roller of each lever arm has sufficient weight to approximately balance the pressure of springs 53 and 57. The lever arms 52 and 56 are formed in such manner that only a small amount of pressure is required from the film running downward to overcome the resistance of either spring 53 or 57. Slow release relays are used in this modification for accurately controlling the operating time of motor 30. The pressure of the film against the roller 51 actuates spring 53 to establish a circuit between ground through spring 54, winding of slow release relay 60 to battery. The pressure of the film against roller 55 actuates spring 57 to establish a circuit from ground through contact 58, winding of slow release relay 63 to battery. The operation of relay 60 establishes a circuit through its contacts 61 and 62 for energizing motor 30 to reduce the speed of the film driving roller 10. The operation of relay 63 establishes a circuit through contacts 64 and 65 for operating the motor to increase the speed of the film feeding roller 10. The slow release relays, or dash pot relays if desired, may be adjusted to continue the operation of the motor for a time period after the film has been disengaged from the regulator, and the associated contacts opened, to insure the return of the film to its normal path midway between the regulator rollers.

The speed regulator illustrated in Fig. 3 is of the same design as the regulator shown in Fig. 1 with the exception that it requires no counterweight for static balance. This regulator is mounted on bearing 71 which is constructed to have very little friction so that it may act as a fulcrum to permit the rollers 72 and 73 to restore themselves to their normal position by force of gravity. It is apparent that a regulator of this character would only require a slight pressure from the film to establish a circuit between spring contact 74 and contact 75 or 76 for operating the motor 30 either directly or by establishing circuits through slow release relays.

While certain novel features of the invention have been shown and described and recited in the annexed claims, it will be understood that substitutions and changes in the forms and details illustrated may be made without departing from the spirit of the invention.

What is claimed is:

1. Film feeding mechanism for sound picture apparatus including friction devices and devices which grip perforations in the film, means for forming loose arcuate loops in said film between said gripping and feeding devices for absorbing film flutter, a film speed regulator in one of said loose loops, operable by pressure from the film and requiring less pressure for operation than would distort the film loop sufficiently to cause a departure of the flutter absorbing qualities of the film in said loop, and means operable by the movement of said regulator for altering the speed of said film.

2. Film feeding mechanism for sound picture apparatus including friction devices and devices which grip perforations in the film, means for forming loose arcuate loops in said film between said gripping and friction devices for absorbing film flutter, a film speed regulator having devices positioned a selected distance each side of the normal path of the film in one of said loops operable by pressure from the film in an out of normal path, said devices requiring less pressure for operation than would distort the film loop sufficiently to cause a departure of the flutter absorbing qualities of the film in said loop, and means operable by the movement of the regulator in one direction for increasing the speed of the film and operable by the movement of the regulator in the other direction for decreasing the speed of the film.

3. Film feeding mechanism for sound picture apparatus including friction devices and devices which grip perforations in the films, means for forming loose arcuate loops in said film between said gripping and friction devices for absorbing film flutter, a statically balanced film speed regulator in one of said loose loops, operable by pressure from the film and requiring less pressure for operation than would distort the film loop sufficiently to cause a departure of the flutter absorbing qualities of the film in said loop, and means operable by the movement of said regulator for altering the speed of said film.

4. Film feeding mechanism for sound picture apparatus including friction devices and devices which grip perforations in the film, means for forming loose arcuate loops in said film between said gripping and friction devices for absorbing film flutter, a statically balanced speed regulator associated with the normal path of the film in one of said loose loops, operable by pressure from the film and requiring less pressure for operation than would distort the film loop sufficiently to cause a departure of the flutter absorbing qualities of the film in said loop, means operable by the movement of said regulator for altering the speed of said film and a centering device for said regulator for normally positioning it a selected distance from the normal path of the film in said loop.

5. Film feeding mechanism for sound picture apparatus including friction devices and devices which grip perforations in the film, means for forming loose arcuate loops in said film between said gripping and friction devices for absorbing film flutter, a film speed regulator in one of said loose loops, operable by pressure from the film and requiring less pressure for operation than would distort the film loop sufficiently to cause a departure of the flutter absorbing qualities of the film in said loop, and a switch operable by the movement of said regulator arranged to energize apparatus for altering the speed of said film.

6. Film feeding mechanism for sound picture apparatus including friction devices and devices which grip perforations in the film, means for forming loose arcuate loops in said film between said gripping and friction devices for absorbing film flutter, a film speed regulator in one of said loose loops, operable by pressure from the film and requiring less pressure for operation than would distort the film loop sufficiently to cause a departure of the flutter absorbing qualities of the film in said loop, and electrical circuit contacts operable by the movement of said regulator in one direction to energize apparatus for increasing the speed of said film and in the other direction to energize apparatus for decreasing the speed of said film.

7. Film feeding mechanism for sound picture apparatus including friction feeding devices and feeding devices which grip the film, means for forming arcuate loops in said film between said gripping and friction devices for absorbing film flutter, a film speed regulator having devices positioned a selected distance each side of the normal path of the film in one of said loops, operable by pressure of the film in an out of normal path, said devices requiring less pressure for operation than would distort the film loop sufficiently to cause a departure of the flutter absorbing qualities of the film in said loop, a switch operable by the movement of either regulator device arranged to operate apparatus for altering the speed of said film, including apparatus for timing the restoration of the film to said normal path in the loop.

8. Film feeding mechanism for sound picture apparatus in which the film is fed through the sound translating area by a smooth roller and through other areas of the sound picture apparatus by toothed sprockets, means for isolating the film in the sound translating area from flutter irregularities produced by the association of said sprocket teeth and film, said means including loose film loops between the sprocket and the sound translating area, a film velocity regulator associated with the film in one of said loose loops but normally out of engagement with the film, means associated with said velocity regulator and operable thereby for increasing and decreasing the velocity of said smooth roller and means for actuating said velocity regulator by pressure from the film when out of normal position of said film loop which pressure is insufficient to cause a departure of the isolation of the translating area from film flutter.

RUDOLPH F. MALLINA.